US009965322B2

(12) United States Patent
Woo et al.

(10) Patent No.: US 9,965,322 B2
(45) Date of Patent: May 8, 2018

(54) SCHEDULING TASKS IN A DISTRIBUTED PROCESSING SYSTEM WITH BOTH RECONFIGURABLE AND CONFIGURABLE PROCESSORS

(71) Applicant: Samsung Electronics Co., Ltd., Suwon-si (KR)

(72) Inventors: Kyoung-Gu Woo, Seoul (KR); Jungmin Seo, Seongnam-si (KR); Jupyung Lee, Suwon-si (KR); Seungchul Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 13/858,334

(22) Filed: Apr. 8, 2013

(65) Prior Publication Data
US 2013/0268937 A1 Oct. 10, 2013

(30) Foreign Application Priority Data

Apr. 9, 2012 (KR) .................... 10-2012-0036921

(51) Int. Cl.
*G06F 9/48* (2006.01)
*G06F 9/50* (2006.01)
(52) U.S. Cl.
CPC .......... *G06F 9/4881* (2013.01); *G06F 9/5044* (2013.01)
(58) Field of Classification Search
CPC ..................................................... G06F 9/4881
See application file for complete search history.

(56) References Cited

U.S. PATENT DOCUMENTS

| 7,065,764 | B1 * | 6/2006 | Prael et al. ................... 718/102 |
| 7,895,453 | B2 | 2/2011 | Kasahara et al. |
| 8,250,548 | B2 | 8/2012 | Kasahara et al. |
| 8,612,180 | B2 | 12/2013 | Yan et al. |
| 8,719,367 | B2 | 5/2014 | Kato et al. |
| 8,812,880 | B2 | 8/2014 | Kasahara et al. |
| 2002/0178282 | A1 * | 11/2002 | Mysore et al. ............... 709/234 |
| 2007/0033592 | A1 | 2/2007 | Roediger et al. |
| 2007/0255929 | A1 | 11/2007 | Kasahara et al. |
| 2008/0021951 | A1 | 1/2008 | Lurie et al. |
| 2008/0089302 | A1 | 4/2008 | Godfrey et al. |
| 2008/0189703 | A1 * | 8/2008 | Im ........................ G06F 9/4881 718/100 |

(Continued)

FOREIGN PATENT DOCUMENTS

| CN | 101504619 A | 8/2009 |
| CN | 101652750 A | 2/2010 |

(Continued)

OTHER PUBLICATIONS

Drive, wiktionary, https://en.wiktionary.org/wiki/drive.*

(Continued)

*Primary Examiner* — Charlie Sun
(74) *Attorney, Agent, or Firm* — NSIP Law

(57) ABSTRACT

A distributed processing system includes a plurality of task nodes each configured to have a capability of processing a task using a reconfigurable processor, and having a capability of processing the task using a non-reconfigurable processor if the task is not processed using the reconfigurable processor, and a scheduler node configured to select a task node that is to process the task from the plurality of task nodes.

39 Claims, 9 Drawing Sheets

(56) References Cited

U.S. PATENT DOCUMENTS

| | | | |
|---|---|---|---|
| 2009/0031312 A1* | 1/2009 | Mausolf | G06F 9/5072 718/102 |
| 2010/0131590 A1 | 5/2010 | Coleman et al. | |
| 2010/0131592 A1 | 5/2010 | Zhang et al. | |
| 2010/0131966 A1 | 5/2010 | Coleman et al. | |
| 2010/0325394 A1* | 12/2010 | Golla et al. | 712/208 |
| 2011/0004574 A1 | 1/2011 | Jeong et al. | |
| 2011/0004916 A1 | 1/2011 | Schiffman et al. | |
| 2011/0093852 A1* | 4/2011 | Li et al. | 718/100 |
| 2011/0167425 A1* | 7/2011 | Lurie | G06F 9/5072 718/102 |
| 2013/0160016 A1* | 6/2013 | Gummaraju et al. | 718/102 |

FOREIGN PATENT DOCUMENTS

| | | |
|---|---|---|
| CN | 102043673 A | 5/2011 |
| JP | 2006-190167 A | 7/2006 |
| JP | 2006-293768 A | 10/2006 |
| JP | 2007-328415 A | 12/2007 |
| KR | 10-2007-0061795 A | 6/2007 |
| KR | 10-2009-0059851 A | 6/2009 |
| KR | 10-2011-0002509 A | 1/2011 |

OTHER PUBLICATIONS

Task, wiktionary, https://en.wiktionary.org/wiki/task.*
Jan Gray, Hands-on Computer Architecture-Teaching Processor and Integrated Systems Design with FPGAs, the 2000 workshop on Computer architecture, 2000.*
Iseli, et al., Spyder: A Reconfigurable VLIW Processor using FPGAs, 1993, IEEE.*
Digilent Baysy Board, Nov. 2008.*
Xilinx, Virtex-4 FPGA Configuration User Guide, 2009.*
Klingman, et al., FPGA Programming Step by Step, 2004.*
O. Storaasli, "FPGA Acceleration: 3 Generations," presented at the HPC User Forum, Roanoke, VA, Apr. 22, 2009 (25 pages).
G. Lee et al., "Heterogeneity-Aware Resource Allocation and Scheduling in the Cloud," *Proceedings of the 3rd USENIX Workshop on Hot Topics in Cloud Computing (HotCloud '11)*, workshop held Jun. 14-15, 2011, Portland, OR, paper presented on Jun. 14, 2011 (5 pages).
"Partial re-Configuration" in *Wikipedia, the free encyclopedia* [last modified on Mar. 14, 2013 at 20:45], retrieved from the Internet <URL: http://en.wikipedia.org/wiki/Partial_re-configuration> (3 pages).
Jantsch, Axel, et al., "A case study on hardware/software partitioning." Proceedings from the IEEE Workshop on FPGAs for Custom Computing Machines, 1994, pp. 111-118. (8 pages in English).
Extended European Search Report dated Jul. 27, 2016 in counterpart European Application No. 13162963.6 (9 pages in English).
Japanese Office Action dated Mar. 28, 2017 in Counterpart Japanese Application No. 2013-080972 (4 pages in Japanese, with English translation).
Chinese Office Action dated May 2, 2017 in Counterpart Chinese Application No. 201310120824.8 (14 in Chinese, with English translation).
Korean Office Action dated Jan. 11, 2018, in corresponding Korean Application No. 10-2012-0036921 (1 page in English, 10 pages in Korean).

* cited by examiner

FIG. 3

| TASK NODE | RP GAIN | | | |
| --- | --- | --- | --- | --- |
| | Case I | Case II | Case III | Case IV |
| Node #0 | 100 | -50 | 100 | 30 |
| Node #1 | 70 | -70 | 10 | 10 |
| Node #2 | 50 | -100 | -30 | -100 |
| TASK PROCESSING NODE | Node #0 | Node #2 | Node #0 | Node #2 |
| TASK PROCESSING METHOD | RP | non-RP | RP | non-RP |

SCHEDULING TASKS IN A DISTRIBUTED PROCESSING SYSTEM WITH BOTH RECONFIGURABLE AND CONFIGURABLE PROCESSORS

CROSS-REFERENCE TO RELATED APPLICATIONS

This application claims the benefit under 35 USC 119(a) of Korean Patent Application No. 10-2012-0036921 filed on Apr. 9, 2012, the entire disclosure of which is incorporated herein by reference for all purposes.

BACKGROUND

1. Field

The following description relates to a technique for distributing tasks in a computing environment.

2. Description of Related Art

Recently, studies have been actively conducted on cloud computing that allows users to easily use IT-related services, such as storing data, using a network, using content, or any other IT-related service known to one of ordinary skill in the art through a server on the Internet, and into a technique for resource virtualization of computers at different physical locations. With the rapidly increasing generation and collection of data, data analysis applications are becoming the main applications that operate in a cloud computing environment.

SUMMARY

In one general aspect, a distributed processing system includes a plurality of task nodes each configured to have a capability of processing a task using a reconfigurable processor (RP), and a capability of processing the task using a non-reconfigurable processor (non-RP) when the task is not processed using the reconfigurable processor; and a scheduler node configured to select a task node that is to process the task from the plurality of task nodes.

The scheduler node may be further configured to select a task processing method by which the selected task node is to process the task.

The scheduler node may be further configured to calculate an RP gain based on an RP cost and a non-RP cost; and select the task node and a task processing method by which the selected task node is to process the task based on the calculated RP gain.

The scheduler node may be further configured to select the task node based on magnitude information of the RP gain, and select the task processing method based on direction information of the RP gain.

The scheduler node may be further configured to calculate the non-RP cost based on one or both of a task processing time of the non-reconfigurable processor and a task processing power of the non-reconfigurable processor.

The scheduler node may be further configured to calculate the RP cost based on a task processing time of the reconfigurable processor, or a waiting time for task processing of the reconfigurable processor, or a reconfiguration time of the reconfigurable processor, or a waiting time for reconfiguration of the reconfigurable processor, or a task processing power of the reconfigurable processor, or a reconfiguration power of the reconfigurable processor, or any combination thereof.

The task may include a non-RP logic for the non-reconfigurable processor; and an RP logic for the reconfigurable processor, the RP logic producing a same result as the non-RP logic when the RP logic processes a same task as the non-RP logic.

The selected task node may be further configured to execute a selected one of the non-RP logic and the RP logic in response to a request from the scheduler node.

Each of the plurality of task nodes may be further configured to have a capability of processing a part of a task using the reconfigurable processor, a capability of processing the part of the task using the non-reconfigurable processor when the part of the task is not processed using the reconfigurable processor, a capability of processing a plurality of tasks sequentially, alternately, concurrently, or simultaneously using the reconfigurable processor, and a capability of processing the plurality of tasks sequentially, alternately, concurrently, or simultaneously using the non-reconfigurable processor when the plurality of tasks are not processed using the reconfigurable processor; and the scheduler node may be further configured to select a task node that is to process the part of the task or the plurality of tasks from the plurality of task nodes.

In another general aspect, a distributed processing system includes at least one task node including a reconfigurable processor (RP) and a non-reconfigurable processor (non-RP); and a scheduler node configured to generate a reconfiguration logic for reconfiguring the reconfigurable processor based on a task; and transfer the reconfiguration logic to the at least one task node.

The at least one task node may be a plurality of task nodes each including a reconfigurable processor and a non-reconfigurable processor.

The scheduler node may be further configured to calculate an RP gain based on an RP cost and a non-RP cost; and select a task node that is to process the task from the at least one task node based on the calculated RP gain.

The scheduler node may be further configured to select the task node based on magnitude information of the RP gain.

In another general aspect, a distributed processing system includes at least one task node including a reconfigurable processor (RP) and a non-reconfigurable processor (non-RP); and a scheduler node configured to select a processor that is to process at least one part of a task from the reconfigurable processor and the non-reconfigurable processor based on the task.

The scheduler node may be further configured to select a task node that is to process the task from the at least one task node; and select a task processing method by which the selected task node is to process the task.

In another general aspect, a task node includes a task information receiver configured to receive a task and information about a task processing method; a controller configured to drive a processor corresponding to the task processing method; and at least one processing unit each including a reconfigurable processor (RP) and a non-reconfigurable processor (non-RP); wherein the task processing method is an RP logic or a non-RP logic; and the controller may be further configured to drive the reconfigurable processor when the task processing method is the RP logic; and drive the non-reconfigurable processor when the task processing method is the non-RP logic.

In another general aspect, a scheduler node in a distributed processing system includes a scheduler configured to select a task node that is to process a task from a plurality of task nodes each configured to have a capability of processing a task using a reconfigurable processor (RP), and a capability of processing the task using a non-reconfigurable processor (non-RP) when the task is not processed using the reconfigurable processor.

The scheduler node may further include a job segmenting unit configured to receive a request for processing a job from a client node; segment the job into a plurality of tasks; and output each of the tasks to the scheduler.

The scheduler may be further configured to output schedule information; and the scheduler node may further include an execution requesting unit configured to transmit a task execution request to the selected task node based on the schedule information of the scheduler.

The schedule information may include identification information of the selected task node; and information designating a task processing method by which the task is to be processed by the task node.

Each of the plurality of task nodes may be further configured to have a capability of processing a part of a task using the reconfigurable processor, a capability of processing the part of the task using the non-reconfigurable processor when the part of the task is not processed using the reconfigurable processor, a capability of processing a plurality of tasks sequentially, alternately, concurrently, or simultaneously using the reconfigurable processor, and a capability of processing the plurality of tasks sequentially, alternately, concurrently, or simultaneously using the non-reconfigurable processor when the plurality of tasks are not processed using the reconfigurable processor; and the scheduler may be further configured to select a task node that is to process the part of the task or the plurality of tasks from the plurality of task nodes.

In another general aspect, a scheduling method of a distributed processing system includes comparing a reconfigurable processor (RP) cost with a non-reconfigurable processor (non-RP) cost for each of a plurality of task nodes each configured to have a capability of processing a task using a reconfigurable processor, and a capability of processing the task using a non-reconfigurable processor when the task is not processed using the reconfigurable processor; calculating an RP gain based on a result of the comparing; and selecting a task node and a task processing method by which the selected task node is to process the task based on the calculated RP gain.

Each of the plurality of task nodes may be further configured to have a capability of processing a part of a task using the reconfigurable processor, a capability of processing the part of the task using the non-reconfigurable processor when the part of the task is not processed using the reconfigurable processor, a capability of processing a plurality of tasks sequentially, alternately, concurrently, or simultaneously using the reconfigurable processor, and a capability of processing the plurality of tasks sequentially, alternately, concurrently, or simultaneously using the non-reconfigurable processor when the plurality of tasks are not processed using the reconfigurable processor; and the scheduling may further include selecting a task node and a task processing method by which the selected task node is to process the part of the task or the plurality of tasks based on the calculated RP gain.

In another general aspect, a method of using a task node including a reconfigurable processor (RP) includes receiving a task; generating a reconfiguration logic (RP logic) for reconfiguring the reconfigurable processor based on the task; and transferring the reconfiguration logic to the task node.

The method may further include applying the reconfiguration logic to the reconfigurable processor to reconfigure the reconfigurable processor; and processing at least one part of the task using the reconfigurable processor.

The method may further include selecting the task node from a plurality of task nodes when the task is received.

The task node may further include a non-reconfigurable processor (non-RP); and the selecting of the task node may include calculating an RP gain based on an RP cost and a non-RP cost; and selecting the task node based on the calculated RP gain.

The task node further includes a non-reconfigurable processor (non-RP); and the task may include a non-RP logic for the non-reconfigurable processor; and an RP logic for the reconfigurable processor, the RP logic producing a same result as the non-RP logic when the RP logic processes a same task as the non-RP logic.

In another general aspect, a method of using a task node including a reconfigurable processor (RP) and a non-reconfigurable processor (non-RP) includes receiving a task; selecting a processor that is to process at least one part of the task from the reconfigurable processor and the non-reconfigurable processor based on the task; and requesting the selected processor to process the at least one part of the task.

The method may further include calculating an RP gain based on an RP cost of the reconfigurable processor processing the task and a non-RP cost of the non-reconfigurable processor processing the task; and the selecting may include selecting the processor based on the calculated RP gain.

In another general aspect, a program generation apparatus is provided in a distributed processing system including a plurality of task nodes each configured to have a capability of processing a task using a reconfigurable processor (RP), and a capability of processing the task using a non-reconfigurable processor (non-RP) when the task is not processed using the reconfigurable processor, and a scheduler node configured to select a task node that is to process the task from the plurality of task nodes. The program generation apparatus is configured to generate a program package including an RP logic for the reconfigurable processor, the RP logic producing a same result as a non-RP logic for the non-reconfigurable processor when the RP logic processes a same task as the non-RP logic.

Each of the plurality of task nodes may be further configured to have a capability of processing a part of a task using the reconfigurable processor, a capability of processing the part of the task using the non-reconfigurable processor when the part of the task is not processed using the reconfigurable processor, a capability of processing a plurality of tasks sequentially, alternately, concurrently, or simultaneously using the reconfigurable processor, and a capability of processing the plurality of tasks sequentially, alternately, concurrently, or simultaneously using the non-reconfigurable processor when the plurality of tasks are not processed using the reconfigurable processor; and the scheduling may further include selecting a task node and a task processing method by which the selected task node is to process the part of the task or the plurality of tasks based on the calculated RP gain.

In another general aspect, a distributed processing system includes a plurality of task nodes including a first task node including a reconfigurable processor (RP) and a non-reconfigurable processor (non-RP); a second task node including a reconfigurable processor and not including a non-reconfigurable processor; a third task node including a non-reconfigurable processor and not including a reconfigurable processor; and a scheduler node configured to select a task node to process a task from the plurality of task nodes.

The scheduler node may be further configured to calculate an RP gain for each of the plurality of task nodes based on an RP cost for each of the plurality of task nodes to process the task using a reconfigurable processor, and a non-RP cost for each of the plurality of task nodes to process the task using a non-reconfigurable processor; and select the task node to process the task from the plurality of task nodes based on the calculated RP gain for each of the plurality of task nodes.

The non-RP cost for the second task node not including a non-reconfigurable processor may be a maximum possible non-RP cost that can be processed by the scheduler node; and the RP cost for the third task node not including a reconfigurable processor may be a maximum possible RP cost that can be processed by the scheduler node.

The scheduler node may be further configured to select a processing method by which the selected task node is to process the task from an RP processing method and a non-RP processing method based on the calculated RP gain.

Other features and aspects will be apparent from the following detailed description, the drawings, and the claims.

BRIEF DESCRIPTION OF THE DRAWINGS

FIG. 3 is a diagram for explaining an example of a method of selecting a task processing node and a task processing method.

DETAILED DESCRIPTION

Figure 1:
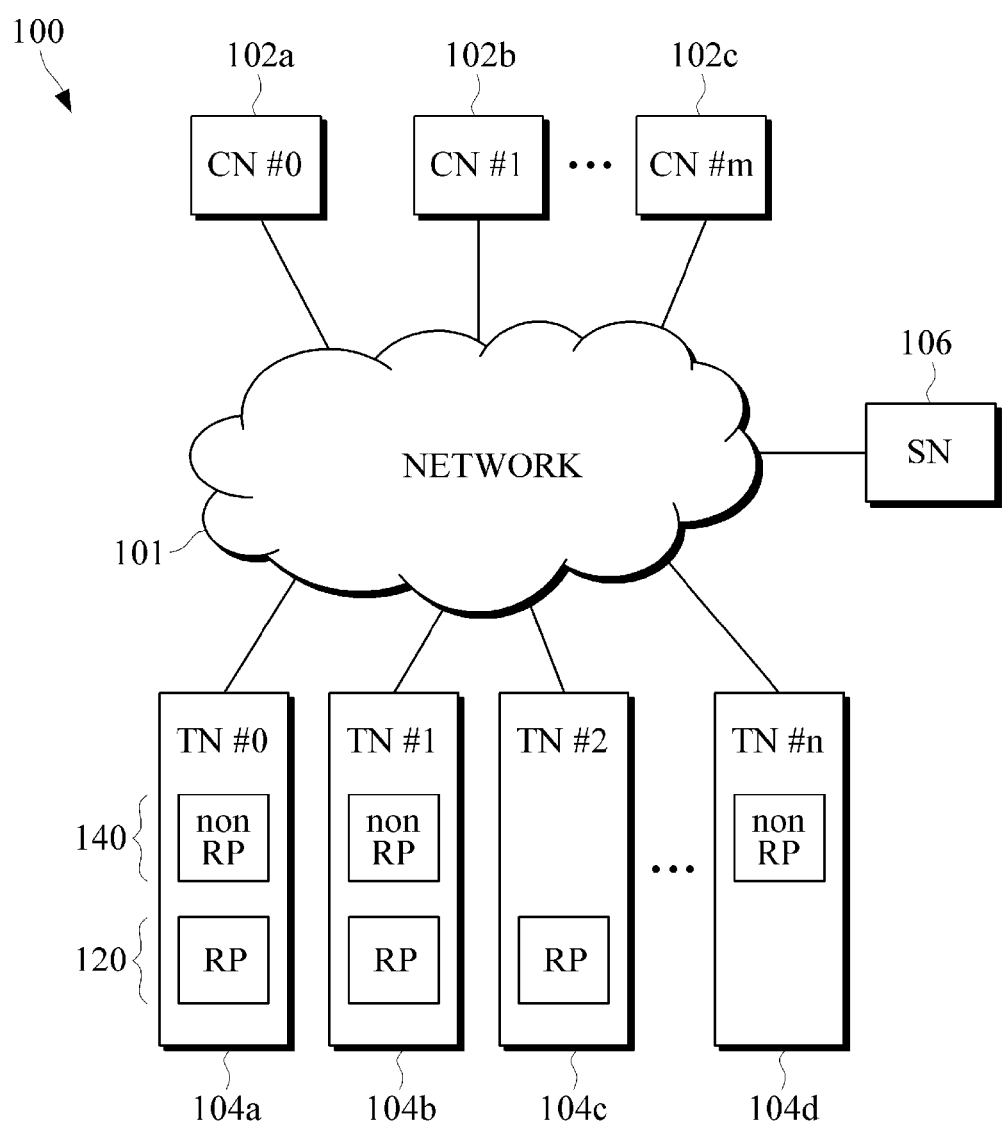
FIG. 1 is a diagram illustrating an example of a distributed processing system.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 1 is a diagram illustrating an example of a distributed processing system 100. The distributed processing system 100 illustrated in FIG. 1 can be used for various purposes. For example, the distributed processing system 100 may be applied to computing systems for mass data processing in financial and medical fields or any other field known to one of ordinary skill in the art in which mass data processing is required, or for specific data processing services, such as data encryption, image processing, or any other specific data processing service known to one of ordinary skill in the art. Also, the distributed processing system 100 may be applied to various network environments including cloud computing or any other network environment known to one of ordinary skill in the art.

Referring to FIG. 1, the distributed processing system 100 includes a network 101, and a plurality of nodes 102a through 102c, 104a through 104d, and 106 that are connected to the network 101. The network 101 may be a wired network or a wireless network. Each of the nodes 102a through 102c, 104a through 104d, and 106 is a computing apparatus that analyzes and processes data. The nodes 102a through 102c, 104a through 104d, and 106 are classified into a plurality of client nodes 102a, 102b, and 102c, a plurality of task nodes 104a, 104b, 104c, and 104d, and at least one scheduler node 106.

Each of the client nodes 102a, 102b, and 102c requests the scheduler node 106 to process a job or a task of a job. Generally, a job consists of a plurality of tasks, but in the following description, the terms "job" and "task" will be used interchangeably for convenience of description.

Each of the task nodes 104a, 104b, 104c, and 104d receives a task from the scheduler node 106, processes the task, and then returns the results of the processing to the scheduler node 106. The scheduler node 106 arranges the results of the processing and then transmits the arranged results to a client node that has issued a request for processing the task.

Each of the task nodes 104a, 104b, 104c, and 104d processes the task using a selected one of a reconfigurable processor (hereinafter referred to as a "RP core") 120 and a non-reconfigurable processor (hereinafter referred to as a "non-RP core") 140. For example, each of the task nodes 104a, 104b, 104c, and 104d activates the RP core 120 or the non-RP core 140 according to an instruction from the scheduler node 106 so that the activated RP core 120 or non-RP core 140 executes a task. At any given time, all of the task nodes 104a, 104b, 104c, and 104d may activate the RP core 120 and none of the task nodes 104a, 104b, 104c, and 104d may activate the non-RP core; or all of the task nodes 104a, 104b, 104c, and 104d may activate the non-RP core 140 and none of the task nodes 104a, 104b, 104c, and 104d may activate the RP core 120; or some of the task nodes 104a, 104b, 104c, and 104d may activate the RP core 120 and some other ones of the task nodes 104a, 104b, 104c, and 104d may activate the non-RP core 140.

The RP core 120 may have a Field-Programmable Gate Array (FPGA) or Coarse-Grained Array (CGA) architecture, and the non-RP core 140 may be a general-purpose Central Processing Unit (CPU), a Graphic Processing Unit (GPU), or a Very Long Instruction Word (VLIW) machine. However, these are merely examples of the RP core 120 and the non-RP core 140, and any device known to one of ordinary skill in the art capable of operating as the RP core 120 or the non-RP core 140 may be used.

Each of the task nodes 104a, 104b, 104c, and 104d includes at least one of the RP core 120 and the non-RP core 140. For example, a task node may include both an RP core 120 and a non-RP core 140, like TN#0 104a and TN#1 104b, or may include only an RP core 120, like TN#2 104c, or may include only a non-RP core 140, like TN#n 104d. However, each of the task nodes 104a, 104b, 104c, and 104d may include both an RP core 120 and a non-RP core 140. The RP core 120 and the non-RP core 140 included in the task nodes 104a, 104b, 104c, and 104d may be the same type or different types as necessary.

Each of the task nodes 104a, 104b, 104c, and 104d may be configured to have a capability of processing a task using the RP core 120, a capability of processing the task using the non-RP core 140 when the task is not processed using the RP core 120, a capability of processing a part of a task using the RP core 120, a capability of processing the part of the task using the non-RP core 140 when the part of the task is not processed using the RP core 120, a capability of processing a plurality of tasks sequentially, alternately, concurrently, or simultaneously using the RP core 120, and a capability of processing the plurality of tasks sequentially, alternately, concurrently, or simultaneously using the non-RP core 140 when the plurality of tasks are not processed using the RP core 120.

Each of the task nodes 104a, 104b, 104c, and 104d updates its own state information periodically and reports the updated information to the scheduler node 106. The state information may include information about whether the RP core 120 is being used, information about an expected time for which the RP core 120 will be used, reconfiguration information of the RP core 120, information about a job processing state of the RP core 120, or any other information about the RP core 120

The scheduler node 106 selects a task processing node that is to execute a task, a part of a task, or a plurality of tasks from the task nodes 104a, 104b, 104c, and 104d. The task may be received from the client nodes 102a, 102b, and 102c, or may be created by segmenting a job received from the client nodes 102a, 102b, and 102c.

The scheduler node 106 selects a task processing node and a task processing method by which the task processing node processes the corresponding task. The task processing method may be an RP method in which a task is processed through the RP core 120, and a non-RP method in which a task is processed through the non-RP core 140.

The scheduler node 106 calculates an RP cost and a non-RP cost for each of the task nodes 104a, 104b, 104c, and 104d. The RP cost may be a time or a power required to process a task using the RP core 120, and the non-RP cost may be a time or a power required to process a task using the non-RP core 140. In other words, the RP cost may be a cost required when a task is processed by the RP core 120, and the non-RP cost may be a cost required when a task is processed by the non-RP core 140. The RP cost is calculated based on a task processing time, or a waiting time for task processing, or a reconfiguration time, or a waiting time for reconfiguration, or a task processing power of the RP core 120, or a reconfiguration power of the RP core 120, or any combination thereof. The task processing power of the RP core 120 is a power consumed by the RP core 120 in processing a task, and the reconfiguration power of the RP core 120 is a power consumed by the RP core 120 in reconfiguring the RP core 120. The non-RP cost is calculated based on a task processing time, or a waiting time for task processing, or a task processing power of the non-RP core 140, or any combination thereof. The task processing power of the non-RP core 140 is a power consumed by the non-RP core 140 in processing a task.

The scheduler node 106 calculates an RP gain for each of the task nodes 104a, 104b, 104c, and 104d. The RP gain represents a numeral value of how much more advantageous it is to use an RP core 120 than to use a non-RP core 140 for processing a task. For example, the scheduler node 106 may use a value obtained by subtracting an RP cost from a non-RP cost as the RP gain.

The scheduler node 106 selects a task node at which a task will be executed based on RP gains calculated for the individual task nodes 104a, 104b, 104c, and 104d. For example, the scheduler node 106 may select a task node based on magnitude information of the RP gains. The magnitude information of the RP gains may be the absolute values of the RP gains. For example, the scheduler node 106 may select a task node having the RP gain with the greatest absolute value, or a plurality of task nodes having the greatest absolute values of RP gains.

In addition to selecting a task node that is to execute a task, the scheduler node 106 selects a task processing method of the selected task node based on the RP gain. For example, the scheduler node 106 may select a task processing method based on direction information of the RP gain. The direction information of the RP gain may be a sign of the RP gain value. For example, the scheduler node 106 may select an RP method if the RP gain of the selected task node is a positive number, and a non-RP method if the RP gain of the task node is a negative number.

Alternatively, the scheduler node 106 may calculate a non-RP gain based on a value obtained by subtracting a non-RP cost from an RP cost, and select a task node and a task processing method according to the calculated non-RP gain.

In this example, it will be assumed that the scheduler node 106 has received a task processing request from the client node CN#0 102a. In order to select a task node that is to process the task, the scheduler node 106 calculates RP gains of the individual task nodes 104a, 104b, 104c, and 104d. Each RP gain is calculated using the RP cost and the non-RP cost of the corresponding task node. If the calculated RP gains of the task nodes 104a, 104b, 104c, and 104d are "+100", "+50", "+30", and "−10", respectively, the scheduler node 106 selects the task node TN#0 104a having the RP gain with the greatest absolute value as the task node that is to execute the task. Also, the scheduler node 106 selects an RP method as a task processing method since the RP gain of the task node TN#0 104a is a positive number. The task node TN#0 104a scheduled by the scheduler node 106 executes the task requested by the client node CN#0 102a and returns the results of the execution to the scheduler node 106.

Alternatively, instead of selecting the task node TN#0 104a having the greatest absolute value of the RP gain, the scheduler node 106 may select two task nodes TN#0 104a and TN#1 104b having the two greatest absolute values of the RP gains. Since the RP gains also are positive numbers, the scheduler node 106 selects the RP method and the task is distributively executed by the task nodes TN#0 104a and TN#1 104b.

Figure 2:
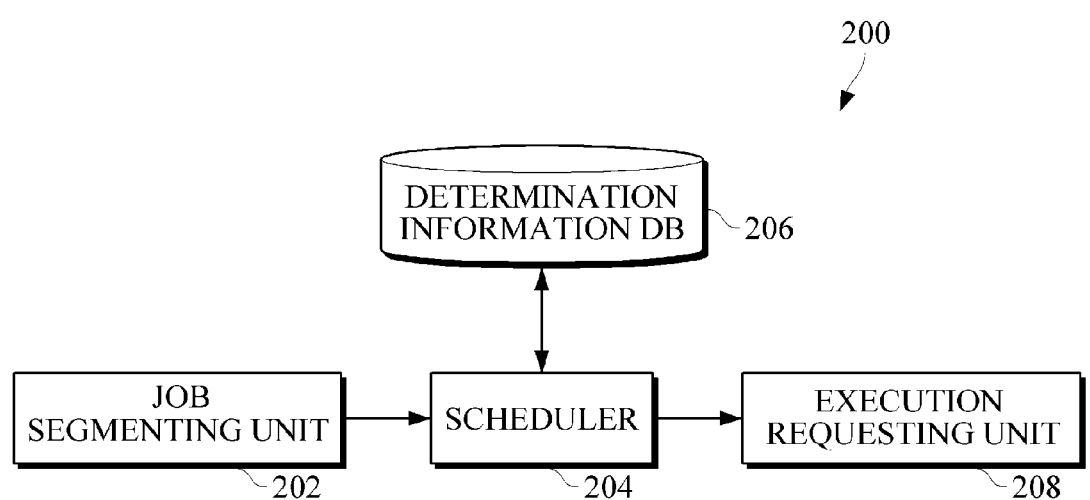
FIG. 2 is a diagram illustrating an example of a scheduler node.

FIG. 2 is a diagram illustrating an example of a scheduler node 200. Referring to FIG. 2, the scheduler node 200 includes a job segmenting unit 202, a scheduler 204, a determination information DB (database) 206, and an execution requesting unit 208. The scheduler node 200 illustrated in FIG. 3 is an example of the scheduler node 106 illustrated in FIG. 1.

The scheduler 204 receives a task processing request, and dynamically selects a task node that is to process the task according to the received task processing request and a task processing method of the task node in a runtime environment. According to the received task processing request, the scheduler 204 calculates the RP gain of each task node based on information stored in the determination information DB 206. The determination information DB 206 stores a scheduling policy of each task node, a record of the previously processed jobs, hardware status information, job setting information, program configuration information, data input/output times, a required power, and any other information about the distributed processing system 100 and jobs that have been processed, are being processed, or are to be processed that the scheduler 204 may need to select a task node and a task processing method of the task node.

In this example, an RP gain is calculated using Equation 1 below.

$$RP\ Gain = Cost\_nonRP - Cost\_RP \quad (1)$$

In Equation 1, Cost_nonRP is a non-RP cost that represents a time or power required when a task is processed by a non-RP core, and Cost_RP is an RP cost that represents a time or a power required when the task is processed by an RP core.

For easy understanding, the non-RP cost may be expressed as a function of time by Equation 2 below.

$$Cost\_nonRP = Time\_WaitForExecutionWithoutRP + Time\_ExecutionWithoutRP \quad (2)$$

In Equation 2, Time_WaitForExecutionWithoutRP represents a waiting time for task execution by the non-RP core, and Time_ExecutionWithoutRP represents a task processing time of the non-RP core.

Also, for easy understanding, the RP cost may be expressed as a function of time by Equation 3 below.

$$Cost\_RP = Time\_WaitForRP + Time\_ToRP + Time\_WaitForExecutionWithRP + Time\_ExecutionWithRP \quad (3)$$

In Equation 3, Time_WaitForRP is a waiting time for reconfiguration of the RP core, Time_ToRP is a reconfiguration execution time of the RP core, Time_WaitForExecutionWithRP is a waiting time for task execution of the RP core, and Time_ExecutionWithRP is a task processing time of the RP core.

In Equations 2 and 3, time has been used as a cost factor to calculate the costs, but the costs may be calculated using a required power as the cost factor. Also, it is possible to assign weights to some of the factors according to the purposes of applications. In the examples of Equations 2 and 3, a waiting time has been calculated as a separate factor that is distinguished from a processing time, but the waiting time and the processing time may be calculated as one cost factor.

The scheduler 204 selects a task node that is to process the task and a task processing method using the RP gain of each task node calculated using Equations 1, 2, and 3. This will be described in detail below with reference to FIG. 3.

FIG. 3 is a diagram for explaining an example of a method of selecting a task processing node and a task processing method. In Case I in FIG. 3, the RP gain of Node#0 is "100". This means that a difference between the non-RP cost and the RP cost of Node#0 is 100. For example, if the non-RP core of Node#0 requires 150 seconds to process a task and the RP core of Node#0 requires 50 seconds to process the task, the RP gain of Node#0 is calculated to be 100 (=150−50). In other words, this means that Node#0 has a gain of 100 when the RP method is used to process the task, compared to when the non-RP method is used to process the task. Likewise, in the case of Node#2 of Case II, an RP gain of "−100" means that there is a loss of 100 when the RP method is used to process a task, compared to when the non-RP method is used to process the task. In other words, this means that Node#2 of Case II has a gain of 100 when the non-RP method is used to process the task, compared to when the RP method is used to process the task.

In Case I in FIG. 3, it is assumed that the RP gains of individual task nodes are 100, 70, and 50, respectively. In Case I, the scheduler 204 in FIG. 2 selects a task node Node#0 having the greatest absolute value of the RP gain as a task processing node. Also, since the RP gain of the selected Node#0 is a positive number, the scheduler 204 selects the RP method as a task processing method.

In Case II in FIG. 3, it assumed that the RP gains of individual task nodes are −50, −70, and −100, respectively. In Case II, the scheduler 204 in FIG. 2 selects a task node Node#2 having the greatest absolute value of the RP gain as a task processing node. Also, since the RP gain of the selected Node#2 is a negative number, the scheduler 204 selects the non-RP method as a task processing method. That is, in Case II, since no task node has a superior result when using the RP method instead of the non-RP method, the non-RP method is used and the Node#2 having the largest non-RP gain (that is, the smallest RP gain) is selected.

Similarly, in Case III in FIG. 3, the scheduler 204 in FIG. 2 selects Node#0 as a task processing node and selects the RP method as a task processing method, and in Case IV in FIG. 3, the scheduler 204 in FIG. 2 selects Node#2 as a task processing node and selects the non-RP method as a task processing method.

However, FIG. 3 merely shows a simple example to enable easy understanding, and a task processing node and a task processing method may be selected in any other ways. For example, it is possible to select two or more task nodes for processing a task by assigning predetermined priorities according to RP gains. Also, a task processing method may be selected based on the results of comparison between RP gains and a predetermined threshold value, without being dependent on whether the RP gains are positive/negative numbers. Furthermore, it is also possible to assign a predetermined RP cost and a predetermined non-RP cost to a task node having only an RP core or only a non-RP core. RP costs, non-RP costs, a method of calculating costs and gains, a policy for selecting a task processing node and a task processing method, and any other information relating thereto may be stored in the determination information DB 206.

Returning again to FIG. 2, the scheduler 204 transfers schedule information including identification information of a selected task processing node and information about a selected task processing method to the execution requesting unit 208. The execution requesting unit 208 requests the selected task node to process the corresponding task according to the schedule information. In this example, if the RP core of the selected task node is not in a standby state for execution of a task when the RP method is selected as a task processing method, the execution requesting unit 208 may request reconfiguration of the RP core before requesting processing of the task.

A task input to the scheduler 204 may be subject to pre-processing. For example, when the scheduler node 200 receives a job execution request from a client node, the job segmenting unit 202 may segment the job into a plurality of tasks and transmit each task in the form of a list to the scheduler 204. The scheduler 204 selects a task processing node and a task processing method for each task, and provides schedule information including the selected task processing node and task processing method in the form of a list to the execution requesting unit 208.

Figure 4:
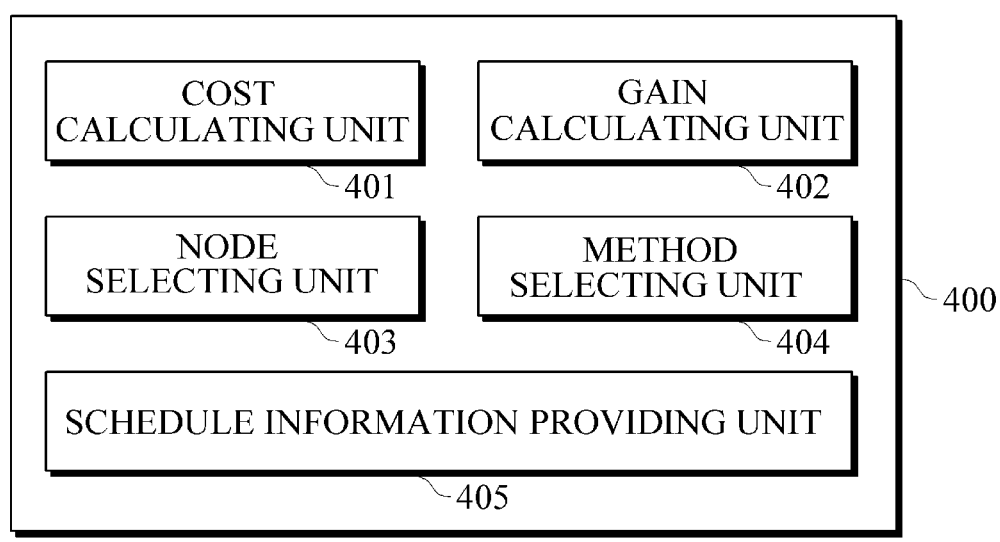
FIG. 4 is a diagram illustrating an example of a scheduler.

FIG. 4 is a diagram illustrating an example of a scheduler 400. Referring to FIG. 4, the scheduler 400 includes a cost calculating unit 401, a gain calculating unit 402, a node selecting unit 403, a method selecting unit 404, and a schedule information providing unit 405. The scheduler 400 illustrated in FIG. 4 is an example of the scheduler 204 illustrated in FIG. 2.

The cost calculating unit 401 calculates an RP cost and a non-RP cost for each task node. The RP cost is a cost required when a task node processes a task using an RP core, and the non-RP cost is a cost required when the task node processes the task using a non-RP node. If a certain task node includes only an RP core or only a non-RP core, a core that does not exist in the task node may be allocated an appropriate cost value. For example, a core that does not exist in the task node may be allocated a maximum cost that can be processed by the scheduler 400. If an RP cost is set to a maximum cost when the task node includes no RP core, a possibility that an RP core will be selected can be excluded. Likewise, if a non-RP cost is set to a maximum cost when the task node includes no non-RP core, a possibility that a non-RP core will be selected can be excluded.

The gain calculating unit 402 compares an RP cost with a non-RP cost to calculate an RP/non-RP gain. For example, the gain calculating unit 402 sets a value obtained by subtracting the non-RP cost from the RP cost as the RP gain.

The node selecting unit 403 selects a task processing node that is to process a task based on the calculated gain. For example, the node selecting unit 403 selects a task processing node based on magnitude information of an RP gain.

The method selecting unit 404 selects a task processing method of the task processing node based on the calculated gain. For example, the method selecting unit 404 selects a task processing method based on direction information representing the sign of the RP gain.

The schedule information providing unit 405 creates schedule information including information about the selected task processing node and the selected task processing method. The created schedule information is provided to the execution requesting unit 208 (see FIG. 2) or the selected task processing node.

Figure 5:
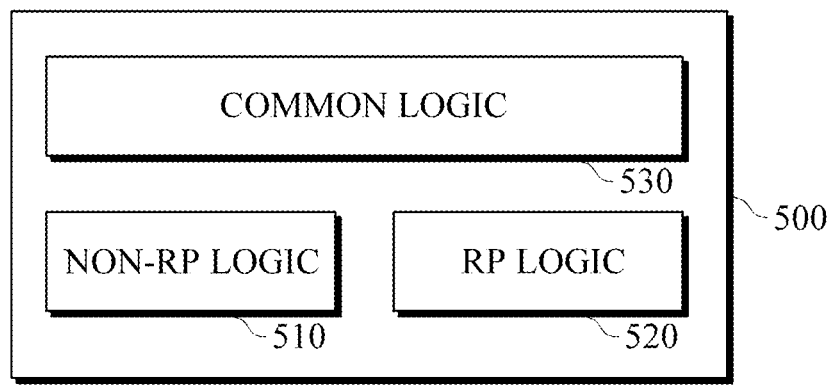
FIG. 5 is a diagram illustrating an example of a program package.

FIG. 5 is a diagram illustrating an example of a program package 500. Referring to FIG. 5, the program package 500 corresponds to a task that is to be executed in each task node, and includes a non-RP logic 510 and an RP logic 520. As described above, the task is processed by a non-RP method or an RP method in a task node according to a request from a scheduler node. The non-RP logic 510 is a program part that is executed by a non-RP core when the non-RP method is selected. For example, the non-RP logic 510 may be an execution code of a task for a general-purpose CPU. The RP logic 520 is a program part that is executed by an RP core when the RP method is selected. For example, the RP logic 520 may be an execution code of a task for a reconfigurable processor.

The RP logic 520 may include a logic for interfacing with an RP core and a logic for reconfiguration of the RP core. The logic for reconfiguration of the RP core relates to configuration information of the RP logic, and may be configured in the form of binary data (for example, bit streams), metadata describing configuration information, or a logic language.

In this example, the non-RP logic 510 may be 1:1 mapped to the RP logic 520 so that the non-RP logic 510 and the RP logic 520 both produce a same result when the RP logic processes a same task. The RP logic 520 may be automatically generated by a program generation apparatus. Such a program generation apparatus may generate a logic for reconfiguration of an RP core based on a task and a logic for interfacing with the RP core. The logic for reconfiguration of the RP core is transferred to the task node and used to reconfigure an RP core before the corresponding task is executed.

In the example in FIG. 5, the program package 500 also includes a common logic 530. The common logic 530 is a program part that is executed in common by a non-RP core and an RP core regardless of the RP method or the non-RP method. In FIG. 5, the common logic 530 is shown as a separate logic, but the common logic 530 may be a part of the non-RP logic 510 or the RP logic 520. Also, the common logic 530 may be executed only by a non-RP core (for example, a general-purpose CPU), instead of being executed in common by the non-RP core and the RP core.

Figure 6A:
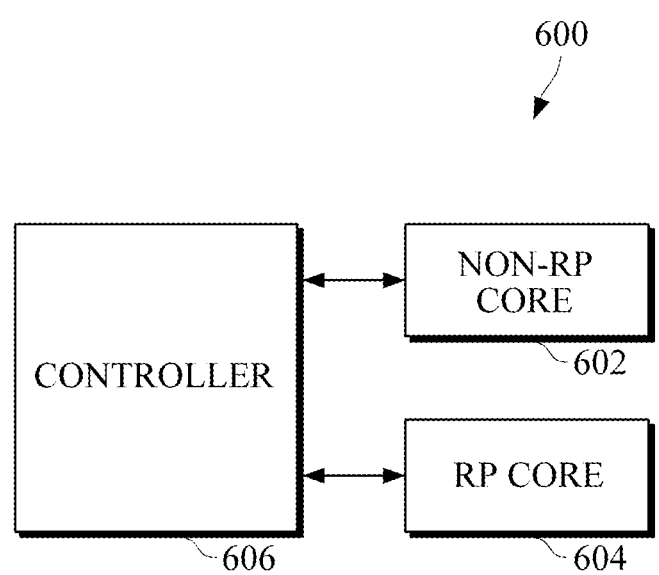
FIG. 6A is a diagram illustrating an example of a task node.

FIG. 6A is a diagram illustrating an example of a task node 600. Referring to FIG. 6A, the task node 600 may include a non-RP core 602, an RP core 604, and a controller 606. The non-RP core 602 may be a general-purpose CPU, and the RP core 604 may be a FPGA or CGA whose hardware configuration is changed according to predetermined configuration information. The task node 600 illustrated in FIG. 6A is an example of the task nodes 104a and 104b illustrated in FIG. 1.

The controller 606 controls the operation of the non-RP core 602 and the RP core 604 to process a task using either one of the non-RP core 602 and the RP core 604 according to a scheduling result of a scheduler node (for example, the scheduler node 106 in FIG. 1). For example, if the controller 606 receives a task processing request requesting that a task be processed by the RP core 604 from the scheduler node 106, the controller 606 loads the corresponding bit stream directly into the RP core 604 according to the RP method, or loads the corresponding bit stream from a reconfiguration logic library into the RP core 604, or compiles a user's logic to generate a bit stream and then loads the bit stream into the RP core 604.

The controller 606 may function as an interface of the non-RP core 602 and/or the RP core 604. Also, if there is difficulty in reconfiguring the RP core 604 for a newly received task because a previous task is still being executed by the RP core 604, or reconfiguration of the RP core 604 for the previous task is still being performed or is in a standby state for execution, the newly received task is stored in a standby state in a predetermined queue, and the controller 606 acquires a lock for the RP core 604 to manage the newly received task that is in the standby state.

In the example in FIG. 6A, the controller 606 is logically separated from the non-RP core 602 so that they can operate independently, but the controller 606 and the non-RP core 602 may be configured to operate in the physically same general-purpose CPU.

Figure 6B:
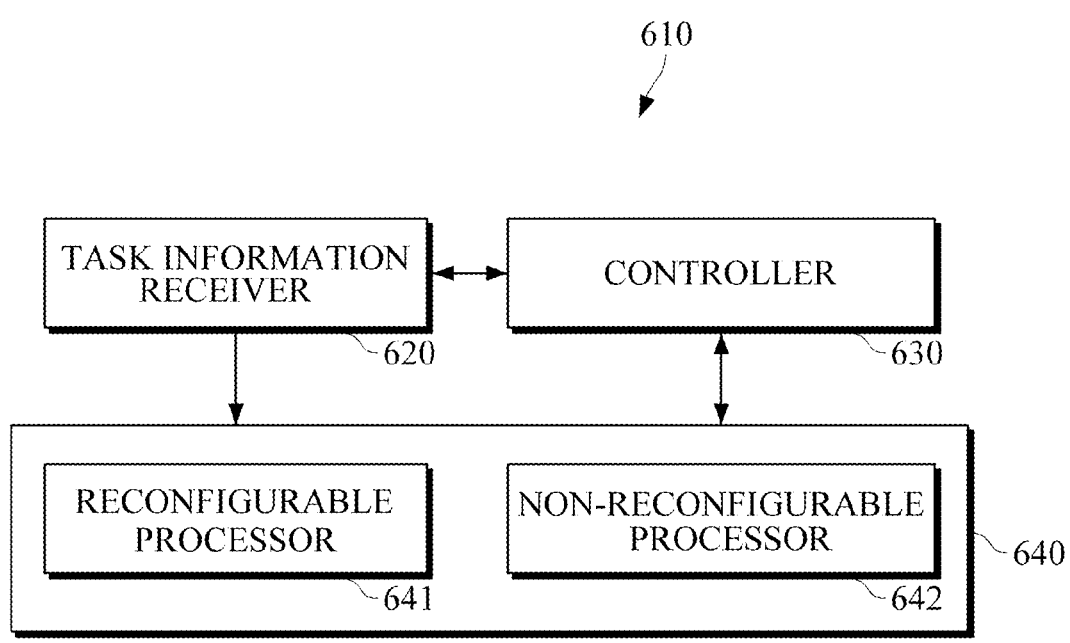
FIG. 6B is a diagram illustrating another example of a task node.

FIG. 6B is a diagram illustrating another example of a task node 610. The task node 610 includes a task information receiver 620, a controller 630, and a processor unit 640. The task node 610 illustrated in FIG. 6B is an example of the task nodes 104a and 104b illustrated in FIG. 1.

The processor unit 640 includes a reconfigurable processor 641, or a non-reconfigurable processor 642, or both the reconfigurable processor 641 and the non-reconfigurable processor 642. For easy understanding, FIG. 6B shows the case where the processor unit 640 includes both the reconfigurable processor 641 and the non-reconfigurable processor 642. However, the processor unit 640 may include only the reconfigurable processor 641 or only the non-reconfigurable processor 642.

The task information receiver 620 receives a task and information about a task processing method from a scheduler node (for example, the scheduler 106 in FIG. 1). The task processing method is the RP logic or the non-RP logic. The task processing method is selected by the scheduler node 106.

The controller 630 drives the reconfigurable processor 641 or the non-reconfigurable processor 642 in correspondence to the received task processing method. For example, if the received task processing method is the RP logic, the controller 630 drives the reconfigurable processor 641, and if the received task processing method is the non-RP logic, the controller 630 drives the non-reconfigurable processor 642.

Figure 7:
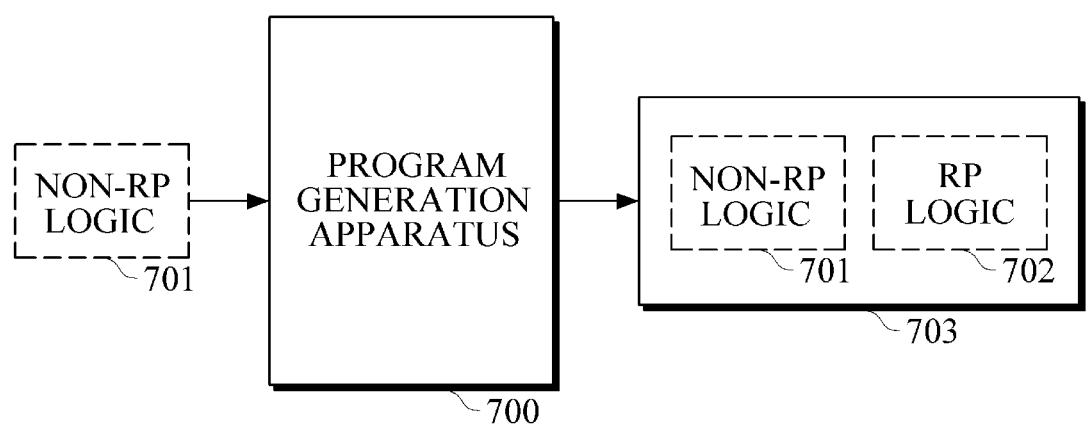
FIG. 7 is a diagram illustrating an example of a program generation apparatus.

FIG. 7 is a diagram illustrating an example of a program generation apparatus 700. Referring to FIG. 7, a user generates a non-RP logic 701 for a general-purpose CPU. The non-RP logic 701 is input to the program generation apparatus 700. The program generation apparatus 700 that has received the non-RP logic 701 performs the same function as the non-RP logic 701, generates an RP logic 702 for an RP core, and 1:1 maps the non-RP logic 701 to the RP logic 702 so that the non-RP logic 701 and the RP logic 702 both produce a same result when the RP logic processes a same task to thereby generate a program package 703. The program package 703 is provided to a task node (for example, the task node 104a in FIG. 1), and the task node 104a selectively executes the non-RP logic 701 or the RP logic 702 under the control of a scheduler node (for example, the scheduler node 106 in FIG. 1).

The program generation apparatus 700 may be included in the scheduler node 200 in FIG. 2, which is an example of the scheduler node 106 in FIG. 1. When the scheduler node 200 receives a job request from a client node (for example, the client node 102a in FIG. 1), the job segmenting unit 202 in the scheduler node 200 segments the job corresponding to the job request into a plurality of tasks. The program generation apparatus 700 generates a program package 703 including a non-RP logic 701 and an RP logic 702 corresponding to each task, and transfers the program package 703 to the scheduler 204 in the scheduler node 200. The scheduler 204 transfers the program package 703 and schedule information including identification information of a selected task processing node and information about a selected task processing method to the execution requesting unit 208 in the scheduler node 200. The execution requesting unit 208 requests the selected task node (for example, the task node 104a in FIG. 1) to process the corresponding task according to the schedule information, and provides the program package 703 to the selected task node. The selected task node selectively executes the non-RP logic 701 or the RP logic 702 in the program package 703 according to the selected task processing method.

FIG. 7 shows the case where the non-RP logic 701 is input to the program generation apparatus 700, but it is also possible that both the non-RP logic 701 and the RP logic 702 are input to the program generation apparatus 700. In other words, a user may generate both the non-RP logic 701 and the RP logic 702. If both the non-RP logic 701 and the RP logic 702 are input to the program generation apparatus 700, the program generation apparatus 700 1:1 maps the non-RP logic 701 to the RP logic 702 so that the non-RP logic 701 and the RP logic 702 both produce a same result when the RP logic processes a same task to thereby generate the program package 703.

Figure 8:
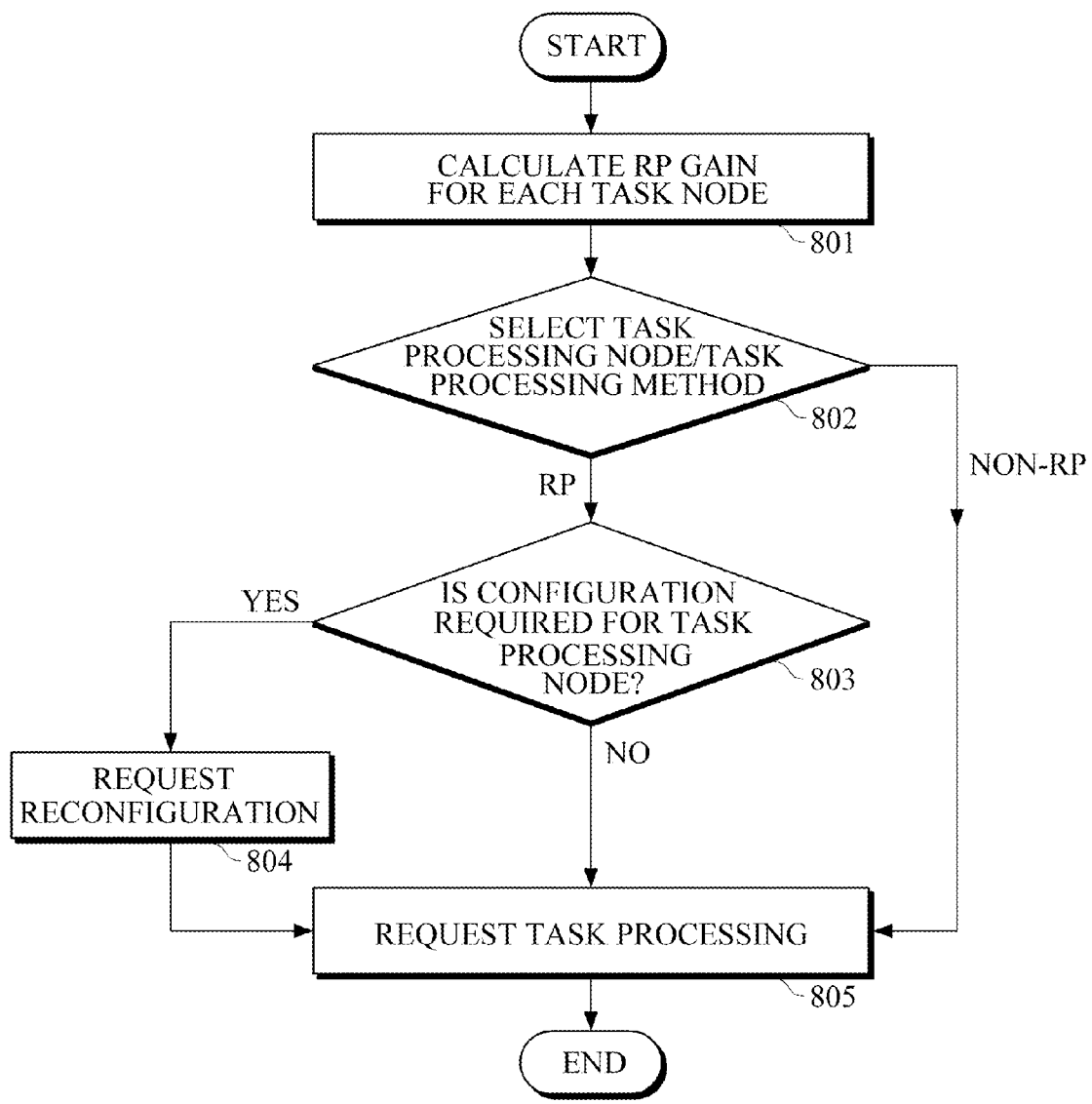
FIG. 8 is a flowchart illustrating an example of a scheduling method of a distributed processing system.

FIG. 8 is a flowchart illustrating an example of a scheduling method of a distributed processing system. Referring to FIGS. 1 and 8, an RP gain is calculated for each task node in response to a job request or a task request (801). For example, as shown in FIG. 3, the scheduler node 106 calculates an RP gain for each task node based on an RP cost and a non-RP cost of each task node.

Then, a task processing node and a task processing method are selected based on the calculated RP gains (802). For example, as shown in FIG. 3, the scheduler node 106 selects a task processing node and a task processing method based on the magnitude of the RP gain and the direction representing the sign of the RP gain.

If a non-RP method is selected, a task processing request for processing the corresponding task is transmitted to the selected task processing node (805). Accordingly, the task processing node processes the task using a non-RP core.

If an RP method is selected, it is determined whether a configuration is required for the selected task processing node (803). For example, the scheduler node 106 determines whether a configuration is required for the task processing node based on state information received from the task processing node. If it is determined that a configuration is required for the task processing node, the scheduler node 106 requests reconfiguration of the task processing node (804) and requests processing of the corresponding task when the task is completely ready to be executed (805). If it is determined a configuration is not required for the task processing node such that the task is ready to be executed, the scheduler node 106 immediately requests processing of the task (805).

As described above, since a job or a task is processed using a distributed processing system where a general-purpose processor coexists with a reconfigurable processor, and a scheduler node selects an optimal task processing node and an optimal task processing method in real time in a runtime environment to distribute a job to the selected task processing node, it is possible to process a job using a processor optimized for the job and to also efficiently use resources.

The client nodes 102a, 102b, and 102c, the task nodes 104a, 104b, 104c, 104d, 600, and 610, the scheduler nodes 106 and 200, the RP cores 120 and 604, the non-RP cores 140 and 602, the job segmenting unit 202, the schedulers 204 and 400, the determination information DB 206, the execution requesting unit 208, the cost calculating unit 401, the gain calculating unit 402, the node selecting unit 403, the method selecting unit 404, the schedule information providing unit 405, the controllers 606 and 630, the task information receiver 620, the reconfigurable processor 641, the non-reconfigurable processor 642, and the program generation apparatus 700 described above may be implemented using one or more hardware components, one or more software components, or a combination of one or more hardware components and one or more software components.

A hardware component may be, for example, a physical device that physically performs one or more operations, but is not limited thereto. Examples of hardware components include amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A distributed processing system comprising:
   plural task nodes each including a reconfigurable processor (RP) for processing a corresponding task, and a non-reconfigurable processor (non-RP) for processing the corresponding task; and
   a scheduler node configured to:
      control a distributing of tasks in a computing environment by:
         calculating, for a task, RP gains for each of the plural task nodes based on a difference between a corresponding RP cost and a corresponding non-RP cost;
         determining a RP gain that has a greatest absolute value among the calculated RP gains; and
         in response to the determining the RP gain:
            selecting a task node, from the plural task nodes, that is to process the task based on the determined RP gain; and
            selecting a task processing method, between an RP-method and a non-RP method, by which the selected task node is to process the task based on direction information of the determined RP gain, wherein, to select the task processing method, the scheduler node is configured to select the RP-method as the task processing method when the direction information represents a first signed direction and select the non-RP method as the task processing method when the direction information represents a different second signed direction, wherein the selected task node processes the task according to the selected task processing method.

2. The distributed processing system of claim 1, wherein the scheduler node is further configured to calculate the corresponding non-RP cost based on one or both of a task processing time of a corresponding non-RP and a task processing power of the corresponding non-RP.

3. The distributed processing system of claim 1, wherein the scheduler node is further configured to calculate the corresponding RP cost based on a task processing time of a corresponding RP, or a waiting time for task processing of the corresponding RP, or a reconfiguration time of the corresponding RP, or a waiting time for reconfiguration of the corresponding RP, or a task processing power of the corresponding RP, or a reconfiguration power of the corresponding RP, or any combination thereof.

4. The distributed processing system of claim 1, wherein the task comprises:
a non-RP logic; and
an RP logic, the RP logic producing a same result as the non-RP logic when the RP logic processes a same task as the non-RP logic.

5. The distributed processing system of claim 4, wherein the selected task node is further configured to execute a selected one of the non-RP logic and the RP logic in response to a request from the scheduler node.

6. The distributed processing system of claim 1, wherein each of the plural task nodes is further configured to process a part of a task using a corresponding RP, process the part of the task using a corresponding non-RP when the part of the task is not processed using the corresponding RP, process a plurality of tasks sequentially, alternately, concurrently, or simultaneously using the corresponding RP, and process the plurality of tasks sequentially, alternately, concurrently, or simultaneously using the corresponding non-RP when the plurality of tasks are not processed using the corresponding RP; and
the selected task node processes the part of the task or the plurality of tasks according to the selected task processing method.

7. The distributed processing system of claim 1, wherein the scheduler node is further configured to generate a reconfiguration logic for reconfiguring a corresponding RP of the selected task node based on the task.

8. The distributed processing system of claim 7, wherein the scheduler node is further configured to transfer the reconfiguration logic to the selected task node.

9. A distributed processing system comprising:
a scheduler node configured to control a distributing of tasks in a computing environment by:
calculating, for a task, RP gains for each of plural task nodes based on a difference between a corresponding RP cost and a corresponding non-RP cost;
determining a RP gain that has a greatest absolute value among the calculated RP gains; and
in response to the determining the RP gain:
selecting a task node from the plural task nodes based on the determined RP gain, the task node selected for performing a task, wherein each of the plural task nodes comprises a reconfigurable processor (RP) and a non-reconfigurable processor (non-RP); and
selecting a task processing method, between an RP-method and a non-RP method, by which the selected task node is to process the task based on direction information of the RP gain, wherein, to select the task processing method, the scheduler node is configured to select the RP-method as the task processing method when the direction information represents a first signed direction, and select the non-RP method as the task processing method when the direction information represents a different second signed direction;
generating a reconfiguration logic for RP reconfiguring based on the task; and
transferring the reconfiguration logic to the selected task node,
wherein the scheduler node and the plural task nodes are respective computing apparatuses connected through a communication network, the distributed processing system further includes the selected task node, and the selected task node processes the task according to the selected task processing method.

10. The distributed processing system of claim 9, wherein the scheduler node is further configured to calculate the corresponding non-RP cost based on one or both of a task processing time of a corresponding non-RP and a task processing power of a corresponding non-RP.

11. The distributed processing system of claim 9, wherein the scheduler node is further configured to calculate the corresponding RP cost based on a task processing time of a corresponding RP, or a waiting time for task processing of the corresponding RP, or a reconfiguration time of the corresponding RP, or a waiting time for reconfiguration of the corresponding RP, or a task processing power of the corresponding RP, or a reconfiguration power of the corresponding RP, or any combination thereof.

12. The distributed processing system of claim 9, wherein the task comprises:
a non-RP logic; and
an RP logic, the RP logic producing a same result as the non-RP logic when the RP logic processes a same task as the non-RP logic.

13. A distributed processing system comprising:
at least one task node comprising a reconfigurable processor (RP) and a non-reconfigurable processor (non-RP); and
a scheduler node configured to select a processor that is to process at least one part of a task, the processor being selected from the RP and the non-RP based on the task,
wherein the scheduler node and the at least one task node are respective computing apparatuses connected through a communication network, and
wherein the scheduler node is further configured toy control a distributing of tasks in a computing environment by:
calculating respective RP gains for the at least one task node based on a difference between a corresponding RP cost and a corresponding non-RP cost: and in response to the determining the RP gain:
selecting a task node that is to process the task from the at least one task node based on a determination of a RP gain that has a greatest absolute value among the calculated respective RP gains; and
selecting a task processing method, between an RP-method and a non-RP method, by which the selected task node is to process the task based on direction information of the determined RP gain, wherein, to select the task processing method, the scheduler node is configured to select the RP-method as the task processing method when the direction information represents a first signed direction, and select the non-RP method as the task processing method when the direction information represents a different second signed direction, and wherein the selected task node processes the task according to the selected task processing method.

14. The distributed processing system of claim 13, wherein the scheduler node is further configured to calculate the corresponding non-RP cost based on one or both of a task processing time of a corresponding non-RP, and a task processing power of the corresponding non-RP.

15. The distributed processing system of claim 13, wherein the scheduler node is further configured to calculate the corresponding RP cost based on a task processing time of a corresponding RP, or a waiting time for task processing of the corresponding RP, or a reconfiguration time of the corresponding RP, or a waiting time for reconfiguration of the corresponding RP, or a task processing power of the corresponding RP, or a reconfiguration power of the corresponding RP, or any combination thereof.

16. The distributed processing system of claim 13, wherein the task comprises:
   a non-RP logic; and
   an RP logic, the RP logic producing a same result as the non-RP logic when the RP logic processes a same task as the non-RP logic.

17. The distributed processing system of claim 16, wherein the task node is further configured to execute a selected one of the non-RP logic and the RP logic in response to a request from the scheduler node.

18. A distributed processing system comprising:
   a scheduler configured to select a task node and a processor at the task node that is to process a task, the task node being selected from a plurality of task nodes each including a reconfigurable processor (RP) for processing a corresponding task, and a non-reconfigurable processor (non-RP) for processing the corresponding task,
   wherein the scheduler is further configured to control a distributing of tasks in a computing environment by:
      calculating RP gains for each of the plurality of task nodes based on a difference between a corresponding RP cost and a corresponding non-RP cost;
      determining a RP gain that has a greatest absolute value among the calculated RP gains; and
      in response to the determining the RP gain:
      selecting the task node, from the plurality of task nodes, that is to process the task based on the determined RP gain; and
      selecting a task processing method, between an RP-method and a non-RP method, by which the selected task node is to process the task based on direction information of the RP gain, wherein, to select the task processing method, the scheduler is configured to select the RP-method as the task processing method when the direction information represents a first signed direction and select the non-RP method as the task processing method when the direction information represents a different second signed direction, and wherein the distributed processing system includes the selected task node, and wherein the selected task node processes the task according to the selected task processing method.

19. The system of claim 18, wherein the scheduler is further configured to calculate the corresponding non-RP cost based on one or both of a task processing time of a corresponding non-RP and a task processing power of a corresponding non-RP.

20. The system of claim 18, wherein the scheduler is further configured to calculate the corresponding RP cost based on a task processing time of a corresponding RP, or a waiting time for task processing of the corresponding RP, or a reconfiguration time of the corresponding RP, or a waiting time for reconfiguration of the corresponding RP, or a task processing power of the corresponding RP, or a reconfiguration power of the corresponding RP, or any combination thereof.

21. The system of claim 18, further comprising a job segmenting unit configured to:
   receive a request for processing a job from a client node;
   segment the job into a plurality of tasks; and
   output each of the tasks to the scheduler.

22. The system of claim 18, wherein the scheduler is further configured to output schedule information; and
   further comprising an execution requesting unit configured to transmit a task execution request to the selected task node based on the schedule information of the scheduler.

23. The system of claim 22, wherein the schedule information comprises:
   identification information of the selected task node; and
   information designating a task processing method by which the task is to be processed by the task node.

24. The system of claim 18, wherein each of the plurality of task nodes is further configured to process a part of a task using a corresponding RP, process the part of the task using a corresponding non-RP when the part of the task is not processed using the corresponding RP, process a plurality of tasks sequentially, alternately, concurrently, or simultaneously using the corresponding RP, and process the plurality of tasks sequentially, alternately, concurrently, or simultaneously using the corresponding non-RP when the plurality of tasks are not processed using the corresponding RP; and
   the selected task node processes the part of the task or the plurality of tasks according to the selected task processing method.

25. A scheduling method of a distributed processing system, the method comprising:
   comparing, for a task, a corresponding reconfigurable processor (RP) cost with a corresponding non-reconfigurable processor (non-RP) cost for each of a plurality of task nodes, each including a RP for processing a corresponding task, and a non-RP for processing the corresponding task; and
   controlling a distributing of tasks in a computing environment by:
      calculating RP gains for each of the plurality of task nodes based on a result of the comparing;
      determining a RP gain that has a greatest absolute value among the calculated RP gains; and
      in response to the determining the RP gain:
      selecting the task node, from the plurality of task nodes, that is to process the task based on the determined RP gain; and
      selecting a task processing method, between an RP-method and a non-RP method, by which the selected task node is to process the task based on direction information of the RP, wherein the selecting of the task processing method further comprises selecting the RP-method as the task processing method when the direction information represents a first signed direction, and selecting the non-RP method as the task processing method when the direction information represents a different second signed direction, wherein the selected task node processes the task according to the selected task processing method.

26. The scheduling method of claim 25, wherein each of the plurality of task nodes is further configured to process a part of a task using a corresponding RP, process the part of the task using a corresponding non-RP when the part of the task is not processed using the corresponding RP, process a plurality of tasks sequentially, alternately, concurrently, or simultaneously using the corresponding RP, and process the plurality of tasks sequentially, alternately, concurrently, or simultaneously using the corresponding non-RP when the plurality of tasks are not processed using the corresponding RP; and the selected task node processes the part of the task or the plurality of tasks according to the selected task processing method.

27. A method of using a scheduler node, the method comprising:
receiving a task;
generating a reconfiguration logic (RP logic) for reconfiguring a reconfigurable processor (RP) based on the task; and
transferring the reconfiguration logic to a selected task node, the selected task node comprising the RP,
wherein the selected task node is selected from a plurality of task nodes,
wherein the scheduler node and the plurality of task nodes are connected through a communication network,
wherein the selecting of the task node comprises controlling a distributing of tasks in a computing environment by:
calculating RP gains for each of the plurality of task nodes based on a difference between a corresponding RP cost and a corresponding non-RP cost;
determining a RP gain that has a greatest absolute value among the calculated RP gains; and
in response to the determining the RP gain:
selecting the task node, from the plurality of task nodes, that is to process the task based on the determined RP gain; and
selecting a task processing method, between an RP-method and a non-RP method, by which the selected task node is to process the task based on direction information of the RP, and-wherein the selecting of the task node comprises selecting the RP-method as the task processing method when the direction information represents a first signed direction, and select the non-RP method as the task processing method when the direction information represents a different second signed direction, and
wherein the selected task node processes the task according to the selected task processing method.

28. The method of claim 27, further comprising calculating the corresponding non-RP cost based on one or both of a task processing time of a corresponding non-RP and a task processing power of a corresponding non-RP.

29. The method of claim 27, further comprising calculating the corresponding RP cost based on a task processing time of a corresponding RP, or a waiting time for task processing of the corresponding RP, or a reconfiguration time of the corresponding RP, or a waiting time for reconfiguration of the corresponding RP, or a task processing power of the corresponding RP, or a reconfiguration power of the corresponding RP, or any combination thereof.

30. The method of claim 27, wherein the task node further comprises a non-reconfigurable processor (non-RP); and
the task comprises:
a non-RP logic; and
an RP logic, the RP logic producing a same result as the non-RP logic when the RP logic processes a same task as the non-RP logic.

31. A method of using a scheduler node, the method comprising:
receiving a task;
controlling a distributing of tasks in a computing environment by:
calculating RP gains for each of a plurality of task nodes based on a difference between a corresponding RP cost and a corresponding non-RP cost;
determining a RP gain that has a greatest absolute value among the calculated RP gains; and
in response to the determining the RP gain:
selecting a task node, from the plurality of task nodes, that is to process at least one part of the task based on the determined RP gain, the task node comprising a reconfigurable processor (RP) and a non-reconfigurable processor (non-RP);
selecting a processor of the task node, between the RP and the non-RP, that is to process the at least one part of the task based on direction information of the determined RP gain, wherein the RP is selected as the processor of the task node when the direction information represents a first signed direction, and the non-RP is selected as the processor of the task node when the direction information represents a different second signed direction; and
requesting the selected processor to process the at least one part of the task, wherein the scheduler node and the task node are connected through a communication network, and
wherein the selected processor of the selected task node processes the task.

32. The method of claim 31, further comprising calculating the corresponding non-RP cost based on one or both of a task processing time of a corresponding non-RP and a task processing power of a corresponding non-RP.

33. The method of claim 31, further comprising calculating the corresponding RP cost based on a task processing time of a corresponding RP, or a waiting time for task processing of the corresponding RP, or a reconfiguration time of the corresponding RP, or a
waiting time for reconfiguration of the corresponding RP, or a task processing power of the corresponding RP, or a reconfiguration power of the corresponding RP, or any combination thereof.

34. The method of claim 31, wherein the task comprises:
a non-RP logic; and
an RP logic, the RP logic producing a same result as the non-RP logic when the RP logic processes a same task as the non-RP logic.

35. A distributed processing system, the distributed processing system comprising:

a plurality of task node, each including a reconfigurable processor (RP) for processing a corresponding task, and a non-reconfigurable processor (non-RP) for processing the corresponding task; and a scheduler node configured to select a task node, and a processor at the task node, that is to process a task, the task node being selected from among the plurality of task nodes, and the processor being selected from one of the RP included in the selected task node and the non-RP included in the selected task node, wherein a program generation apparatus in the distributed processing system being is configured to generate a program package comprising an RP logic for the RP included in the selected task node, the RP logic producing a same result as a non-RP logic for the non-RP included in the selected task node when the RP logic processes a same task as the non-RP logic, wherein the scheduler node is further configured to control a distributing of tasks in a computing environment by:

calculating RP gains for each of the plurality of task nodes based on a difference between a corresponding RP cost and a corresponding non-RP cost;

determining a RP gain that has a greatest absolute value among the calculated RP gains; and in response to the determining the RP gain:

performing the selecting of the task node, from the plurality of task nodes, based on the determined RP gain; and performing the selecting of the processor, between the RP included in the selected task node and the non-RP included in the selected task node, based on direction information of the determined RP gain, wherein, to select the processor, the scheduler node is configured to select the RP included in the selected task node as the processor when the direction information represents a first signed direction and select the non-RP included in the selected task node as the processor when the direction information represents a different second signed direction, and wherein the selected processor of the selected task node processes the task.

36. The distributed processing system of claim 35, wherein each of the plurality of task nodes is further configured to process a part of a task using a corresponding RP, process the part of the task using a corresponding non-RP when the part of the task is not processed using the corresponding RP, process the plurality of tasks sequentially, alternately, concurrently, or simultaneously using the corresponding RP, and process the plurality of tasks sequentially, alternately, concurrently, or simultaneously using the non-RP when the plurality of tasks are not processed using the corresponding RP; and the selected task node processes the part of the task or the plurality of tasks.

37. A distributed processing system comprising:

a scheduler node configured to control a distributing of tasks in a computing environment by:

calculating RP gains for each of a plurality of task nodes based on a difference between a corresponding RP cost and a corresponding non-RP cost;

determining a RP gain that has a greatest absolute value among the calculated RP gains; and in response to the determining the RP gain:

selecting a task node, from the plurality of task nodes, to process a task based on the determined RP gain, the plurality of task nodes comprising:

a first task node comprising a first reconfigurable processor (RP) and a first non-reconfigurable processor (non-RP);

a second task node comprising a second RP and not comprising a corresponding non-RP; and a third task node comprising a second non-RP and not comprising a corresponding RP, wherein the scheduler node is further configured to select a processing method, between an RP-method and a non-RP method, by which the selected task node is to process the task based on direction information of the determined RP gain, and wherein, to select the processing method, the scheduler node is configured to select the RP processing method as the processing method when the direction information represents a first signed direction, and select the non-RP processing method as the processing method when the direction information represents a different second signed direction, and wherein the distributed processing system includes the selected task node, and wherein the selected task node processes the task according to the selected processing method.

38. The distributed processing system of claim 37, wherein a non-RP cost for the second task node is a maximum possible non-RP cost that can be processed by the scheduler node; and a RP cost for the third task node is a maximum possible RP cost that can be processed by the scheduler node.

39. A distributed processing system comprising:

a scheduler node configured to control a distributing of tasks in a computing environment by:

calculating an RP gain based on an RP cost and a non-RP cost; and selecting a task node to process a task based on an absolute value of the RP gain, the task node being selected from a plurality of task nodes, the plurality of task nodes comprising:

a first task node comprising a reconfigurable processor (RP) and a non-reconfigurable processor (non-RP);

a second task node comprising a RP and not comprising a non-RP;

and a third task node comprising a non-RP and not comprising a RP, a third task node comprising a non-RP and not comprising a RP, wherein the scheduler node is further configured to select a processing method by which the selected task node is to process the task based on direction information of the RP gain, the processing method being selected from an RP processing method and a non-RP processing method, wherein a non-RP cost for the second task node is a maximum possible non-RP cost among non-RPs of the plurality of task nodes that can be processed by the scheduler node, and wherein a RP cost for the third task node is a maximum possible RP cost among RPs of the plurality of task nodes that can be processed by the scheduler node, and wherein the distributed processing system includes the selected task node, and wherein the selected task node processes the task according to the selected processing method.

* * * * *